(12) United States Patent
Ertel et al.

(10) Patent No.: US 8,763,793 B2
(45) Date of Patent: Jul. 1, 2014

(54) EXTRUDED RAIL WITH CONTAINED MOUNTING CAVITY

(75) Inventors: Daniel E. Ertel, Oconomowoc, WI (US); Scott M. Hall, Sussex, WI (US); Michael A. Hosch, Oconomowoc, WI (US)

(73) Assignee: Dorner, Hartland, WI (US)

( * ) Notice: Subject to any disclaimer, the term of this patent is extended or adjusted under 35 U.S.C. 154(b) by 333 days.

(21) Appl. No.: 12/944,276

(22) Filed: Nov. 11, 2010

(65) Prior Publication Data

US 2011/0114457 A1 May 19, 2011

Related U.S. Application Data

(60) Provisional application No. 61/260,877, filed on Nov. 13, 2009.

(51) Int. Cl.
*B65G 21/00* (2006.01)
*B65G 21/02* (2006.01)

(52) U.S. Cl.
CPC ................................ *B65G 21/02* (2013.01)
USPC ...................................................... 198/860.1

(58) Field of Classification Search
USPC ............................. 198/860.1, 836.1
See application file for complete search history.

(56) References Cited

U.S. PATENT DOCUMENTS

| | | | | |
|---|---|---|---|---|
| 3,605,994 | A | * | 9/1971 | Parlette ....................... 198/861.1 |
| 5,029,697 | A | * | 7/1991 | McMillan et al. ......... 198/860.2 |
| 6,935,483 | B2 | * | 8/2005 | Veit et al. ................. 198/370.02 |
| 7,043,884 | B2 | * | 5/2006 | Moreno ......................... 52/235 |
| 2008/0210529 | A1 | | 9/2008 | Hau et al. |

FOREIGN PATENT DOCUMENTS

EP    0 036 958 A1    10/1981
EP    1 184 306 A2    3/2002

OTHER PUBLICATIONS

EP Search Report dated Mar. 16, 2011.

* cited by examiner

*Primary Examiner* — William R Harp
(74) *Attorney, Agent, or Firm* — Andrus Intellectual Property Law, LLP (57) ABSTRACT

An extruded rail for mounting objects along the length of the rail that include an enclosed receiving and containment cavity. The extruded rail includes a receiving and containment cavity that extends from an inner surface of the rail. The receiving and containment cavity includes upper and lower walls and a back wall that define an enclosed containment area. An alignment notch is formed in the generally planar outer surface of the side rail and aligned with the receiving and containment cavity. When an object is to be attached to the rail, an opening is formed in the side rail at the alignment notch. As material is removed from the side rail during formation of the opening, the received material is entrapped within the receiving and containment cavity. Thus, the extruded rail of the disclosure receives and contains material removed during attachment of an object to the rail.

13 Claims, 9 Drawing Sheets

EXTRUDED RAIL WITH CONTAINED MOUNTING CAVITY

CROSS-REFERENCE TO RELATED APPLICATION

The present application is based on and claims priority to U.S. Provisional Patent Application Ser. No. 61/260,877 filed on Nov. 13, 2009.

BACKGROUND OF THE INVENTION

The present disclosure generally relates to the configuration of an extruded rail. More specifically, the present disclosure relates to the configuration of an extended side rail of a conveyor frame that allows mounting brackets to be positioned anywhere along the length of the conveyor frame, where the side rail includes a receiving and containment cavity for containing some of the metal shavings created by the mounting process.

Presently, many different extruded rails exist that allow external devices to be supported along the length of the rails. One common application for an extruded rail is as the side rail of a conveyor assembly. Typically, the side rails of a conveyor assembly include some type of open slot that allows mounting brackets to be selectively positioned along the length of the conveyor frame. These mounting brackets are typically secured to the side rail by utilizing some type of locking element received within the open slot formed within the extruded side rail. Once the securing element is positioned within the open side slot, a threaded connector is used to entrap the sidewall of the conveyor side rail between the mounting bracket and the locking element. Although this type of system has worked well in many applications, the open mounting channel creates a place for dirt and other contaminants to collect, which is undesirable especially in a dirty or dusty working environment.

SUMMARY OF THE INVENTION

The present disclosure generally relates to an extruded rail that can be used to mount objects at desired locations along the length of the rail. More specifically, the present disclosure relates to the configuration of an extruded side rail of a conveyor frame assembly that allows mounting brackets to be positioned anywhere along the length of the conveyor frame.

The conveyor frame assembly generally includes a pair of spaced side rails that each extend from a first end to a second end. Each of the side rails has a generally planar outer surface that is devoid of any openings. The generally planar outer surface without any openings prevents the accumulation of dust or other contaminants within the side rail during use of the conveyor frame assembly in a clean environment.

Each of the spaced side rails includes a receiving and containment cavity that extends from an inner surface of the side rail. The receiving and containment cavity is completely enclosed by an upper wall, a lower wall and a back wall. The receiving and containment cavity is open at each end of the side rail. Typically, an end cap or end plate is attached to the conveyor frame at each end to completely enclose the receiving and containment cavity.

Each of the side rails includes an alignment notch that is formed in the outer surface of the side rail. The alignment notch is aligned with the receiving and containment cavity that extends from the inner surface of the side rails. When viewed from the outer surface of the side rail, the alignment notch provides an indication of the location of the otherwise concealed receiving and containment cavity.

The alignment notch is recessed into the outer surface of the side rail such that the thickness of the side rail is reduced at the location of the alignment notch. In one embodiment, the thickness of the material forming the side rail at the alignment notch is one-half the thickness of the material forming other portions of the side rail.

When an object is to be attached to the side rail, such as a mounting bracket, the mounting bracket is positioned in a desired location along the length of the side rail. Preferably, the object is attached to the side rail by using a single connector. In one embodiment of the disclosure, the connector is a self-drilling fastener while in another contemplated embodiment, the connector is a hardened fastener having external threads that create threads in the softer material that forms the side rail. Both embodiments are contemplated as being within the scope of the present disclosure.

Once the mounting bracket is positioned at the desired location along the length of the side rail, the self-drilling fastener is positioned within the alignment notch. Once positioned within the alignment notch, the self-drilling fastener is rotated such that a bite portion of the self-drilling fastener removes the material that forms the sidewall between the alignment notch and the receiving and containment cavity. Once the self-drilling fastener removes the material of the sidewall at the alignment notch, the fastener enters into the receiving and containment cavity. Material that is removed from the side rail at the alignment notch and which is received within the containment cavity is thus prevented from contaminating the environment around the conveyor frame assembly.

As the self-drilling fastener continues to rotate, external threads on the hardened fastener create threads in the softer material that defines the receiving and containment cavity. Specifically, the external threads on the self-drilling fastener create threads within the upper and lower walls of the receiving and containment cavity. In this manner, the self-drilling fastener can be used to attach an object, such as a mounting bracket, to the side rails. During the rotation of the self-drilling fastener, some of the material removed from the sidewall is enclosed and entrapped within the receiving and containment cavity.

In yet another embodiment, the connector used to attach an object, such as a mounting bracket, to the side rail is a hardened fastener having external threads. When hardened fastener is used, an opening is first formed in the sidewall at the desired location. The opening is formed through the material between the alignment notch and the receiving and containment cavity by a drill member. As the drill member forms the opening in the sidewall, some of the material removed from the side rail is contained within the receiving and containment cavity.

Once the opening has been formed and some of the material entrapped within the containment cavity, the fastener passes through the side rail and the external threads formed on the hardened fastener create threads within the softer material that forms the receiving and containment cavity. The interaction between the threads formed on the fastener and the upper and lower walls of the receiving and containment cavity allow the object to be securely mounted to the side rail.

As can be understood by the above description, the receiving and containment cavity allows objects to be fastened directly to the side rail and some of the metal shavings created during the attachment process are received and contained within the receiving and containment cavity. Thus, the conveyor frame assembly using the side rails constructed in accordance with the present disclosure receives and retains some of the metal fragments.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
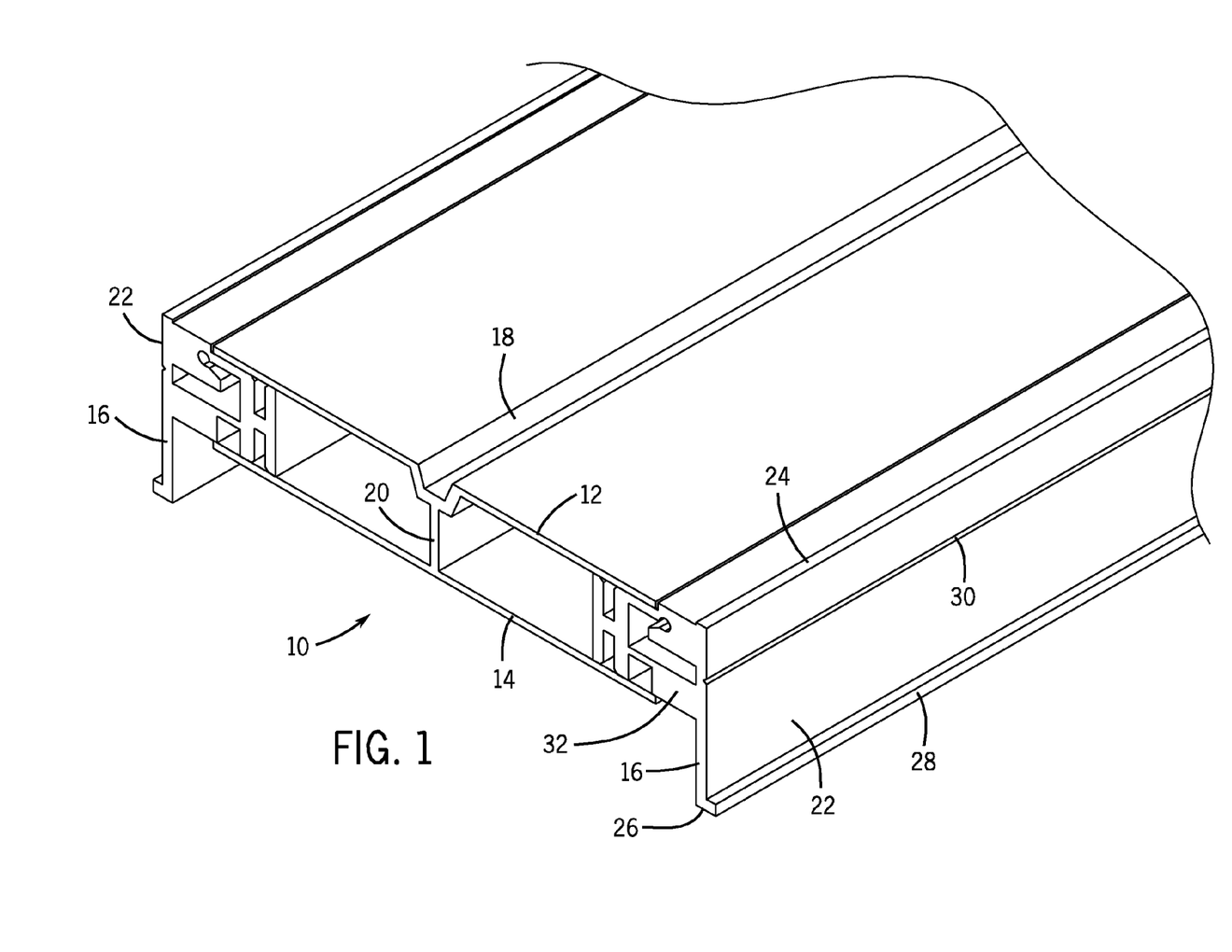
FIG. 1 is a partial perspective view of a conveyor frame including a pair of spaced side rails constructed in accordance with the present disclosure.

FIG. 1 illustrates a conveyor frame 10 constructed in accordance with the present disclosure. In the embodiment shown in FIG. 1, conveyor frame 10 is a multi-piece extruded member formed from aluminum. However, it should be understood that the conveyor frame 10 could be formed in many other alternate configurations, such as from a single piece extrusion, and from different materials while operating within the scope of the present disclosure.

In the embodiment of FIG. 1, the conveyor frame 10 includes a top plate 12 and a bottom plate 14 that extend between a pair of spaced side rails 16. The top plate 12 is configured to support the upper run of a conveyor belt (not shown). In the embodiment illustrated, the top plate 12 includes a guide notch 18 that receives a V-guide formed on the back surface of the conveyor belt. A center web 20 is positioned between the top plate 12 and the bottom plate 14 to provide additional stability for the conveyor frame 10.

As illustrated in FIG. 1, each of the side rails 16 includes a generally planar outer surface 22 that extends between a top edge 24 and a bottom edge 26. In the embodiment shown in FIG. 2, the bottom edge 26 includes a lip 28 that protrudes from the otherwise planar outer surface 22. The generally planar outer surface 22 provides an overall clean appearance for the conveyor frame 10 which is both visually appealing and reduces the ability for contaminants to collect on the sides of the conveyor frame 10.

Referring back to FIG. 1, each side rail 16 includes an alignment notch 30 that extends along the entire length of each of the side rails 16 from a first end 32 to a second end (not shown).

Figure 2:
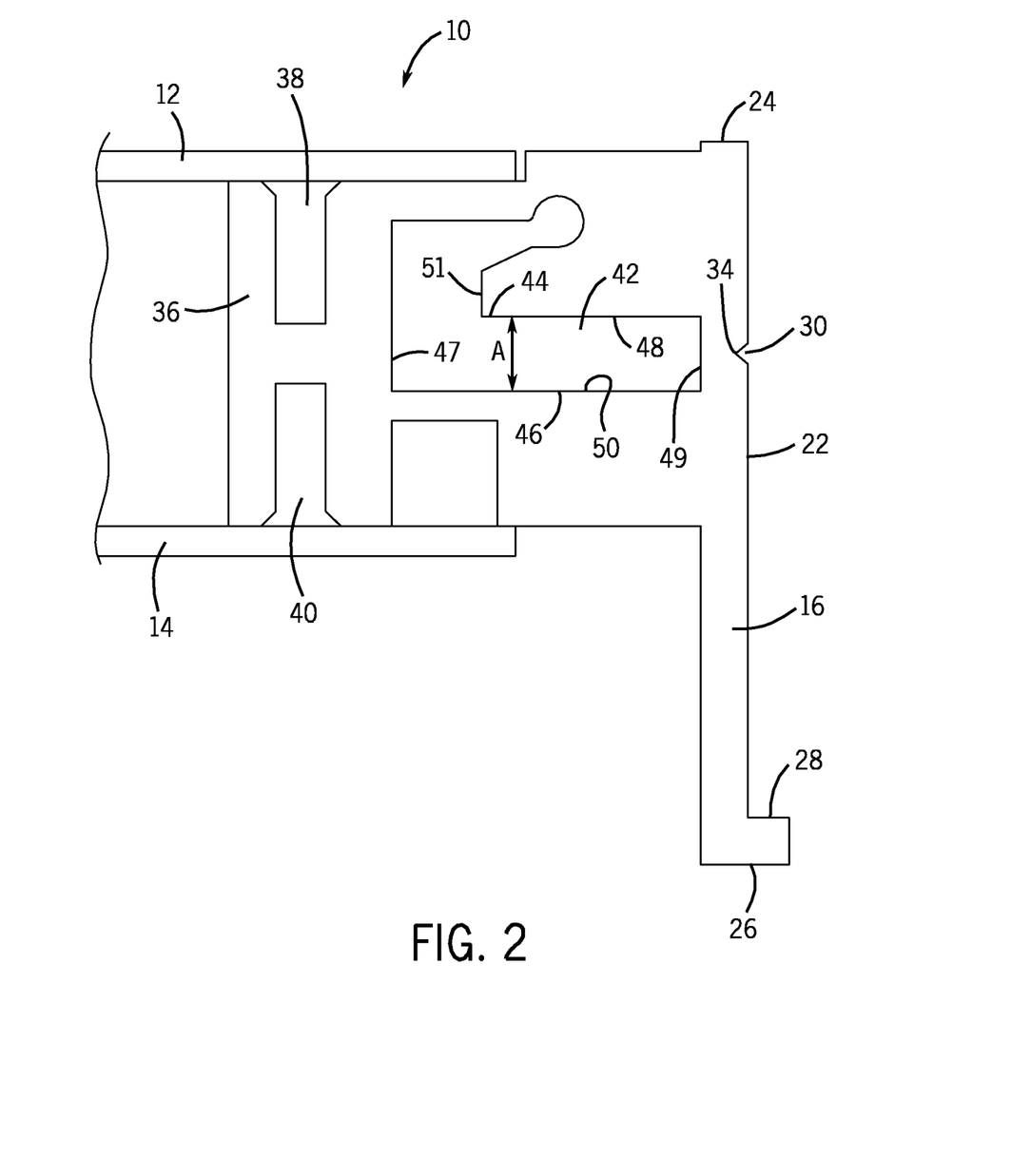
FIG. 2 is a magnified end view of one side of the conveyor frame.

As shown in FIG. 2, the alignment notch 30 is recessed from the otherwise planar outer surface 22 of the side rail 16. In the embodiment illustrated, the alignment notch 30 has a generally V-shape.

In the embodiment shown in FIG. 2, the thickness of the material that forms the side rail 16 at the apex 34 of the alignment notch 30 is approximately one-half the overall thickness of the side rail 16. Although the depth of the alignment notch 30 is shown as being one-half the overall thickness of the side rail 16, it should be understood that the alignment notch 30 could have different depths while operating within the scope of the present disclosure.

As illustrated in FIG. 2, the extruded profile of the conveyor frame 10 includes several extruded cavities defined by horizontal web sections extending between the side rail 16 and a vertical support wall 36. The top mounting cavity 38 and the bottom mounting cavity 40 create mounting passageways that extend along the entire length of the conveyor frame 10. The top and bottom mounting cavities 38, 40 allow the top and bottom plates 12, 14 to be attached between the spaced side rails 16.

In addition to the top and bottom mounting cavities 38, 40, the conveyor frame 10 includes a receiving and containment cavity 42 formed between an extruded upper wall 44 and a lower wall 46. Back wall 47 defines the depth of the receiving and containment cavity 42.

A reduced height receiving portion of the cavity 42 extends from the inner surface 49 to a shoulder 51 and has a height A defined by a first surface 48 formed by the upper wall 44 and a second surface 50 formed by the lower wall 46. The receiving and containment cavity 42 is aligned behind the alignment notch 30 such that the apex 34 is aligned with the center of the cavity 42. The depth of the cavity 42 from the outer surface 22 to the shoulder 51 is designed to receive the threaded portion of a fastener, as will be described in greater detail below.

Figure 2A:
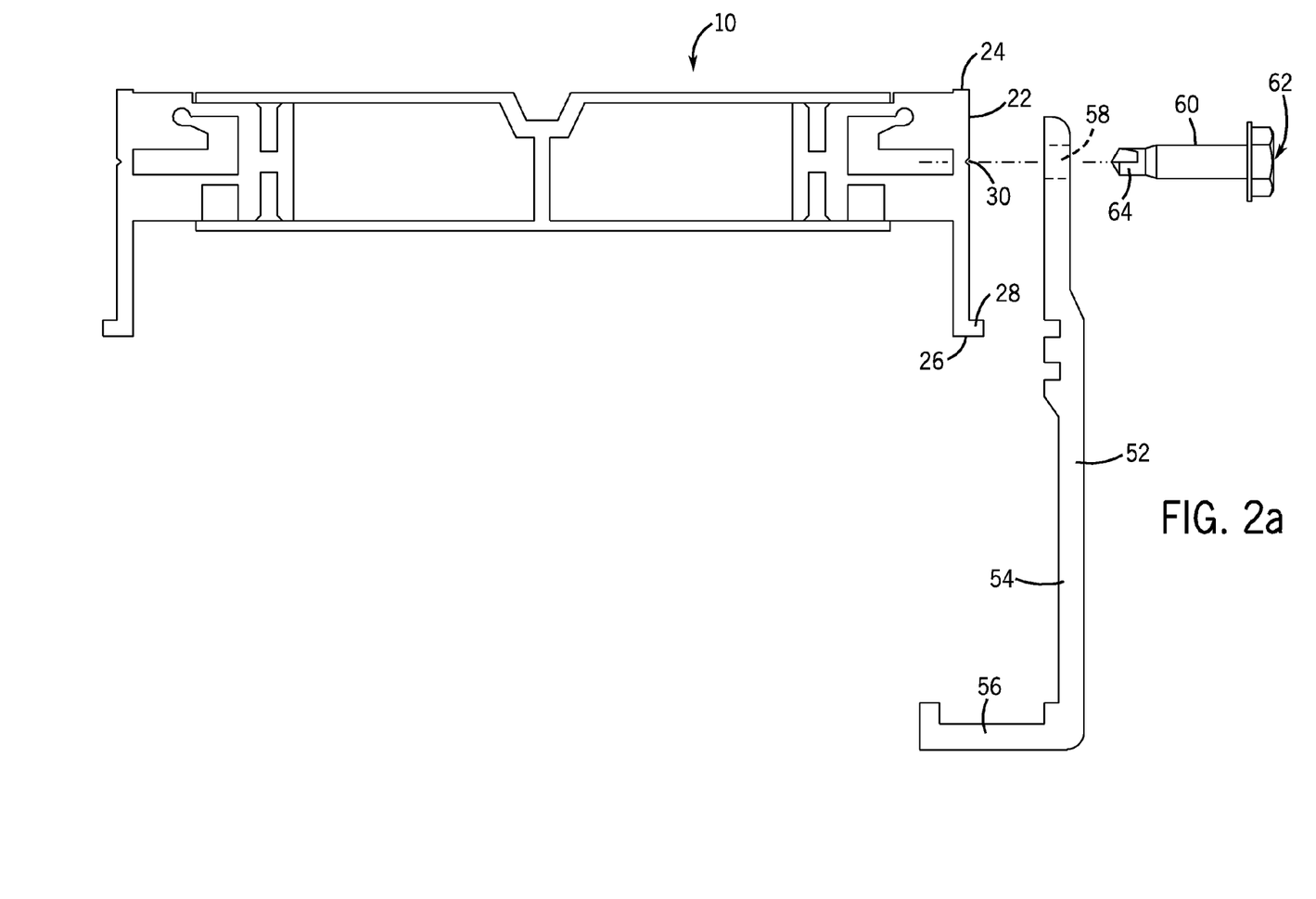
FIG. 2a is an end view of the conveyor frame further illustrating a mounting bracket to be attached to the frame by a self-drilling fastener.

Referring now to FIG. 2a, the conveyor frame 10 is specifically designed to receive and support one or more mounting brackets 52. In the embodiment shown in FIG. 2a, the mounting bracket 52 includes a vertical leg 54 and a horizontal leg 56. The vertical leg 54 includes a mounting hole 58 sized to receive the shaft portion 60 of a self-drilling fastener 62. The self-drilling fastener 62 includes a bite portion 64 having a configuration such that the self-drilling fastener 62 can create a hole within an undrilled surface.

Figure 3:
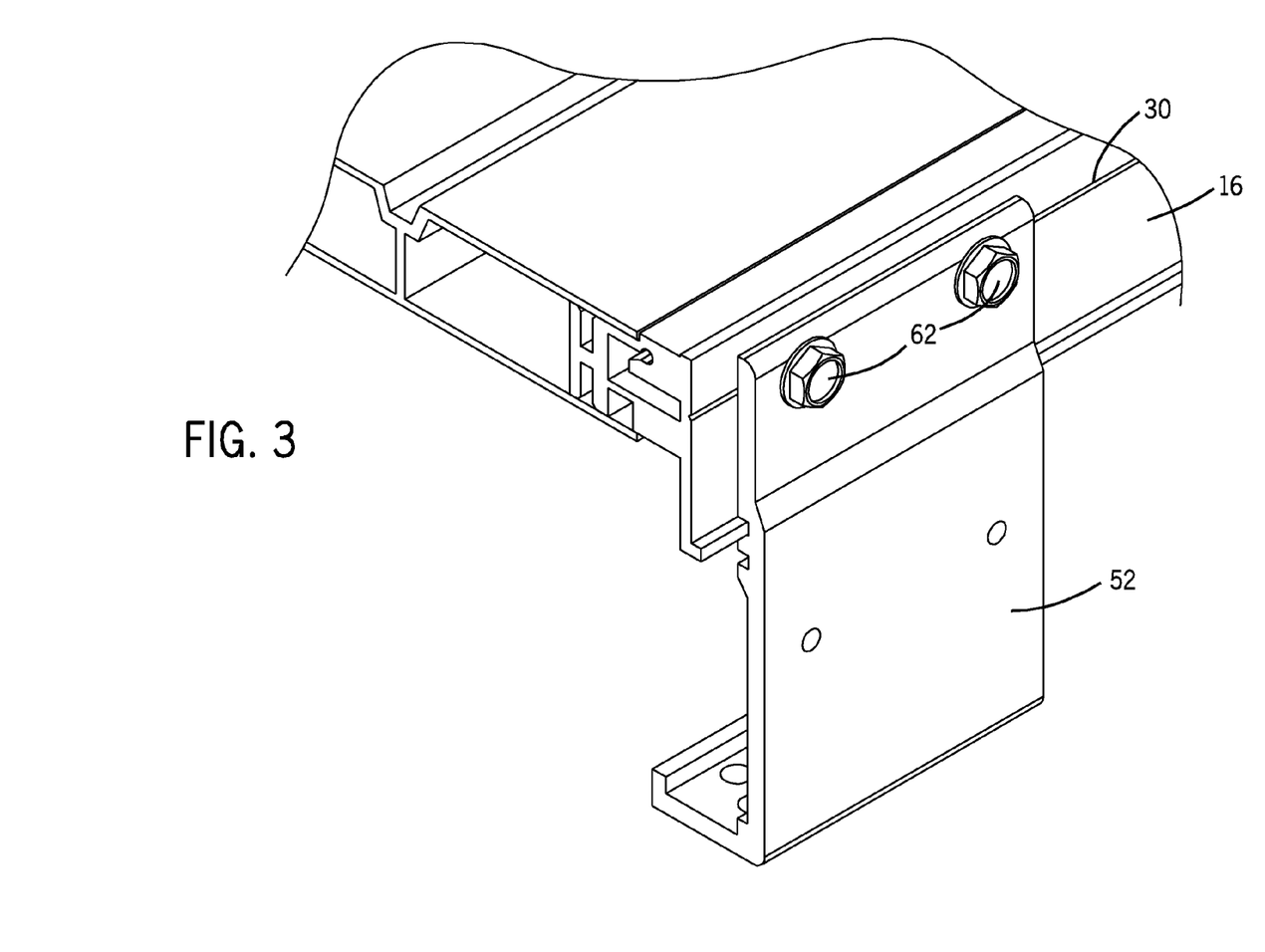
FIG. 3 is a perspective view illustrating the attachment of the mounting bracket to the conveyor frame by a pair of self-drilling fasteners.
Figure 4:
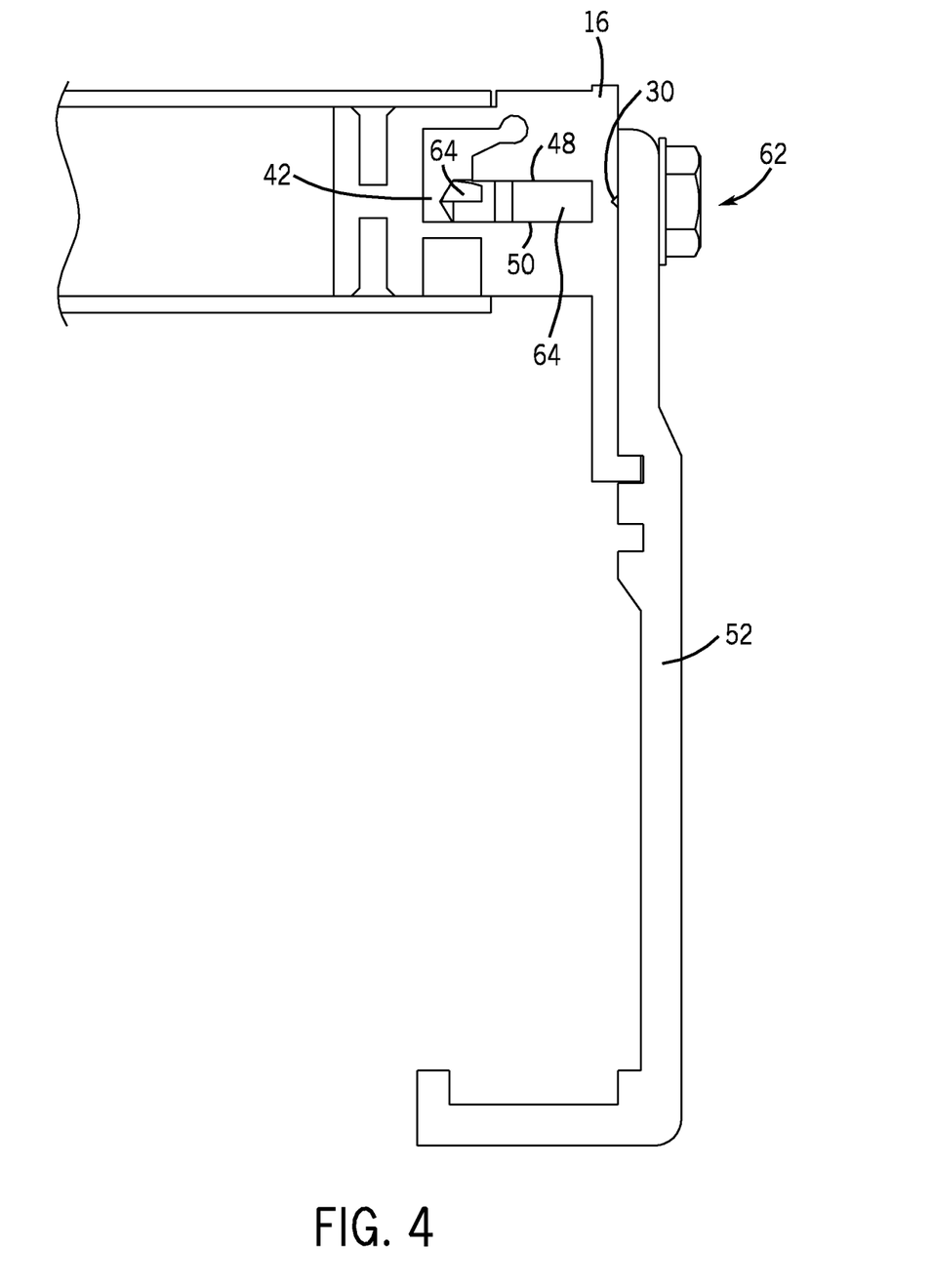
FIG. 4 is a section view illustrating the attachment of the mounting bracket to the conveyor frame using the self-drilling fastener.

FIGS. 3 and 4 generally illustrate the attachment of the mounting bracket 52 to the side rail 16. The self-drilling fastener 62 creates a hole through the side rail 16 at a location identified by the alignment notch 30. In the embodiment of the fastener 62 shown in FIG. 2a, the shaft portion 60 is hardened and includes external threads that form threads in the softer material of the side rail 16.

Referring now to FIG. 4, when the self-drilling fastener 62 is used to attach the mounting bracket 52 to the side rail 16, the bite portion 64 creates a hole through the side rail 16 at the location of the alignment notch 30. As the fastener 62 rotates, external threads on the shaft portion 60 engage the first surface 48 and the second surface 50 that define the cavity 42 and create threads that hold the self-drilling fastener 62 in the position shown.

During the rotation of the self-drilling fastener 62, the bite portion 64 creates metallic shavings or chips, which are the removed portions of the side rail 16 created during formation of the hole within the side rail 16. Since the receiving and containment cavity 42 is entirely enclosed, some of the metallic chips and shavings are retained within the open area defined by the cavity 42.

Figure 5:
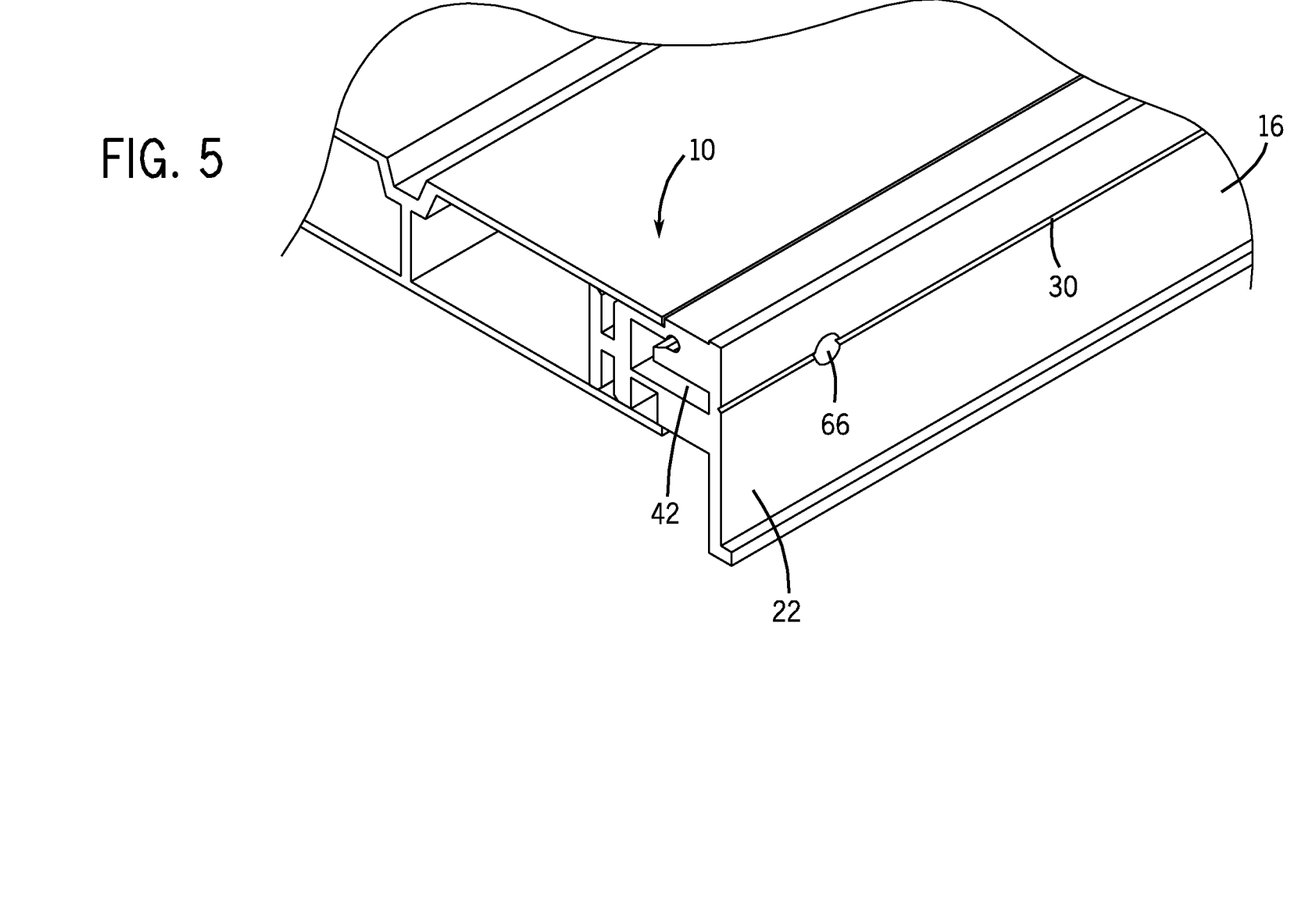
FIG. 5 is a partial perspective view showing the formation of an attachment hole in the alignment notch formed in the conveyor frame.
Figure 6:
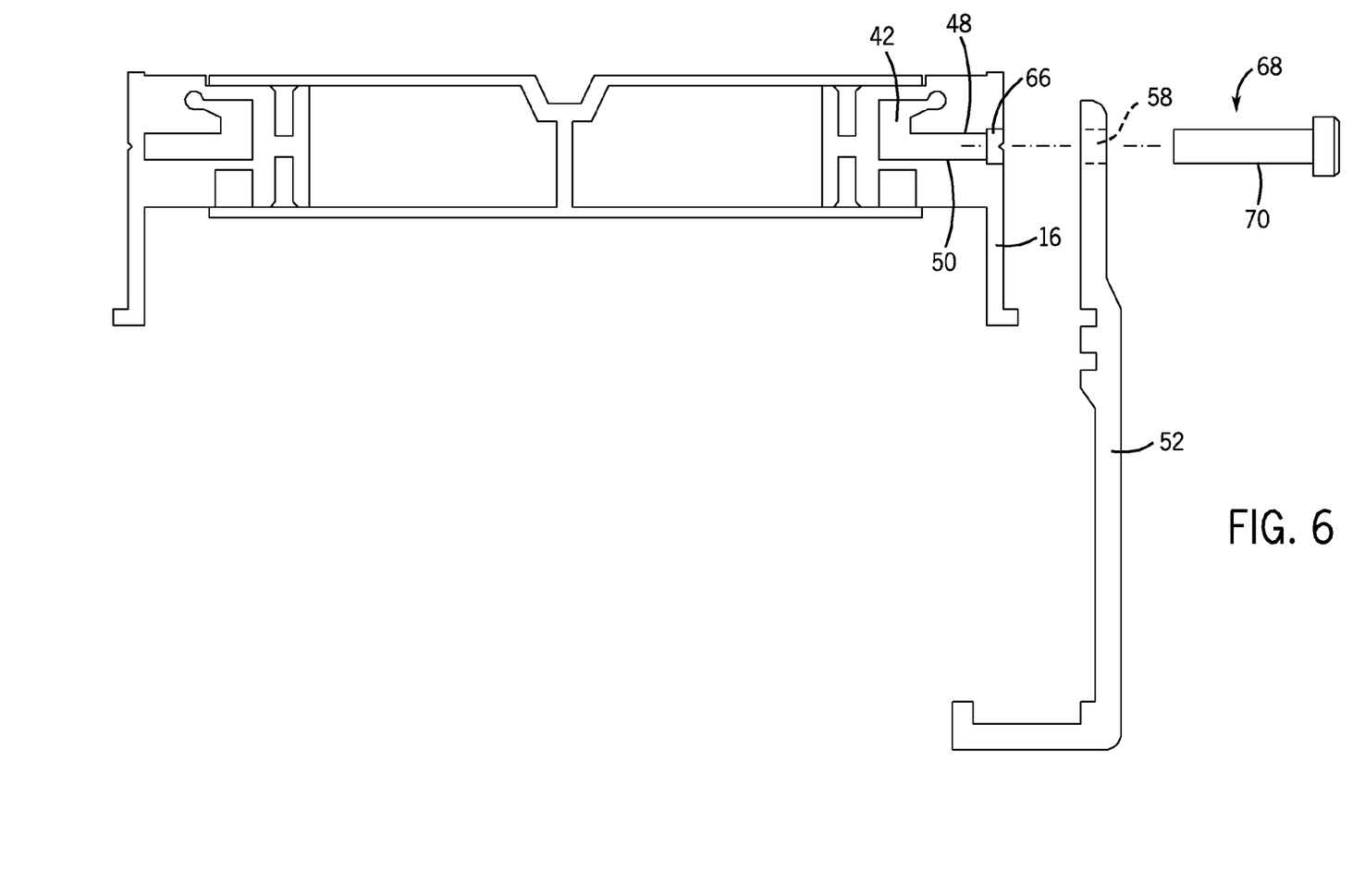
FIG. 6 is an end view showing the attachment of the mounting bracket to the conveyor frame and the inclusion of the mounting hole.
Figure 7:
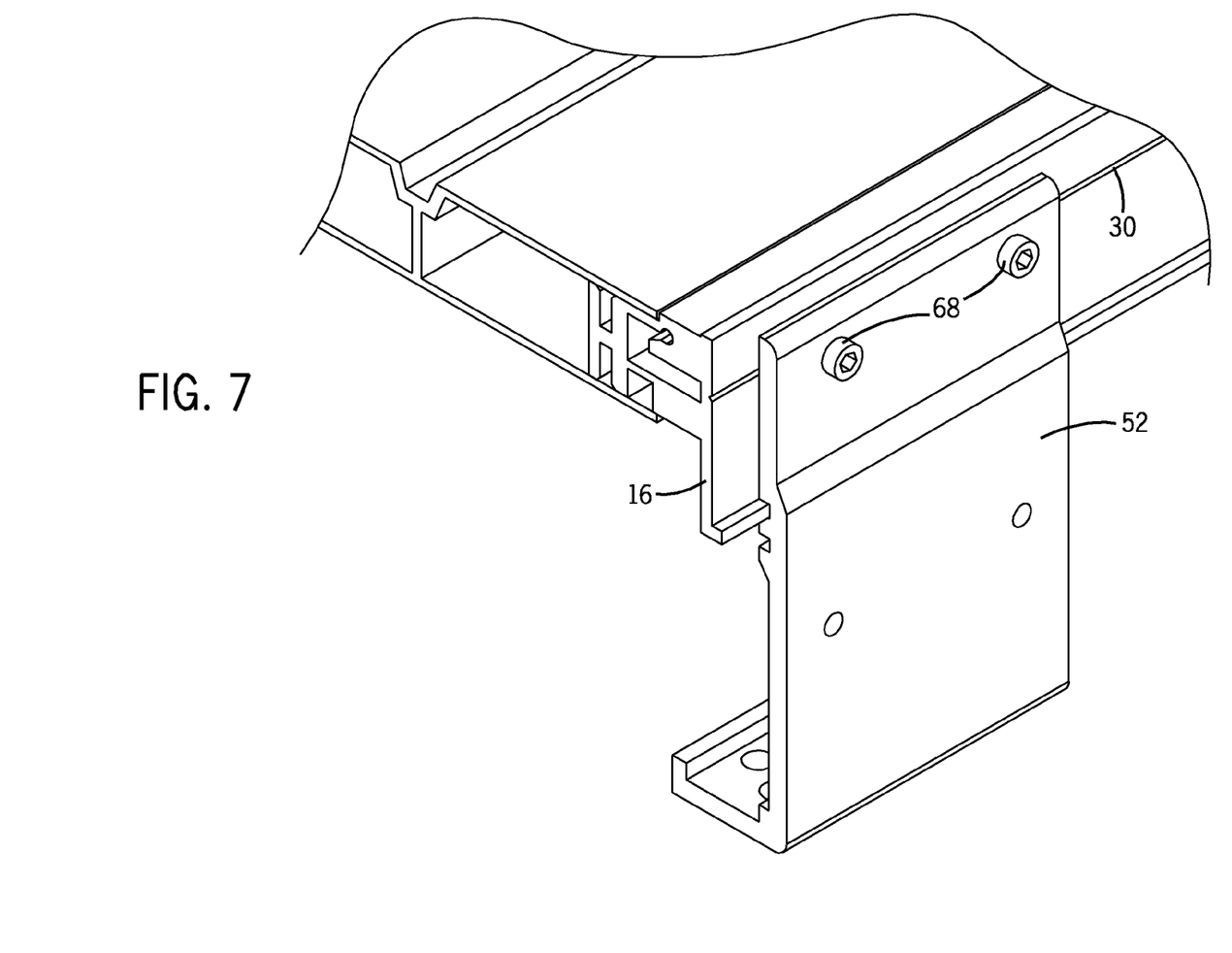
FIG. 7 is a perspective view illustrating the attachment of the mounting bracket to the conveyor frame using conventional threaded fasteners.

Referring now to FIG. 5, there shown is an alternate method of utilizing the conveyor frame 10 of the present disclosure. In the embodiment of FIG. 5, an attachment hole 66 is drilled in the side rail 16 at a desired location along the length of the side rail 16. The attachment hole 66 is formed at a location identified by the alignment notch 30. As previously described, the receiving and containment cavity 42 is positioned behind the outer surface 22 of the side rail 16 at the location identified by the alignment notch 30. When the attachment hole 66 shown in FIG. 6 is drilled in the side rail 16, some of the metal fragments and chips created by the drilling process are retained within the receiving and containment cavity 42. The use of the receiving and containment cavity 42 to contain some of the chips and fragments from the drilling process is particularly desirable since loose metal chips or fragments could damage the operating components of the conveyor assembly. The receiving and containment cavity 42 allows the attachment hole 66 to be formed on site on an as-needed basis.

Figure 8:
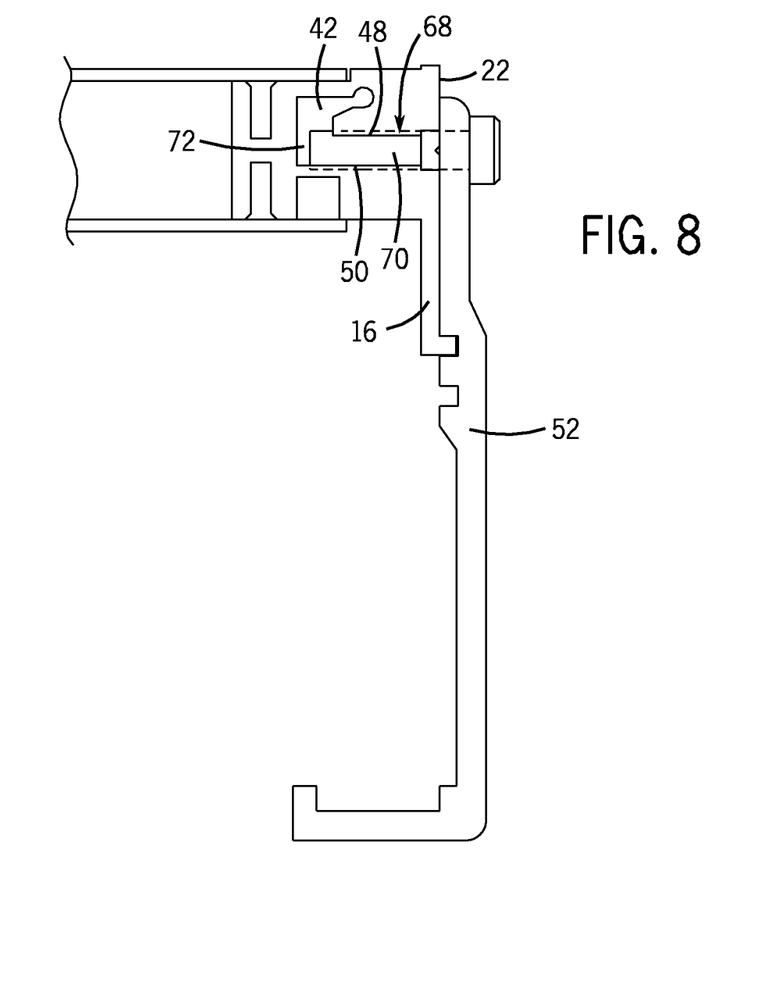
FIG. 8 is a section view illustrating the location of the threaded fastener to hold the bracket on the side rail of the conveyor frame.

Once the attachment hole 66 has been drilled, the mounting bracket 52 is positioned such that the mounting hole 58 is aligned with the attachment hole 66. Once positioned as such, a hardened externally threaded fastener 68 is used to secure the mounting bracket 52 to the side rail 16. The fastener 68 includes a hardened shaft portion 70 having external threads that form threads in the softer material of the side rail 16 as the fastener 68 rotates within the cavity 42. Preferably, the diameter of the attachment hole 66 generally corresponds to the height A of the receiving and containment cavity 42. The diameter of the attachment hole 66 is generally equal to the width of the receiving and containment cavity 42 such that the external threads on the shaft portion 70 engage both the first surface 48 and the second surface 50 to form threads in the first and second surfaces 48, 50 to hold the fastener 68 within the cavity 42. The relationship between the shaft portion 70 and the height of the receiving and containment cavity 42 is best shown in FIG. 8. As illustrated in FIG. 8, the depth of the cavity 42 from the outer surface 22 is slightly greater than the length of the shaft 70 such that an open area 72 remains to receive the shavings and filings created during the drilling and threading process.

Although the embodiment shown in the drawing Figures is shown and described as being used on a conveyor side rail, it should be understood that the same configuration of a side rail 16 and an enclosed receiving and containment cavity 42 could be utilized in other environments, such as on a stand rail, framing rail or other similar applications. The use of the alignment notch 30 to provide an indication of the location of the receiving and containment cavity 42 allows self-drilling fasteners and externally threaded fasteners to be properly aligned with the hidden cavity 42.

Although the drawing Figures and the above description describe utilizing the mounting method with a conveyor frame assembly, it should be understood that the mounting method in accordance with the present disclosure could be utilized in other embodiments. As an example, the mounting method could be utilized in a factory setting in which it is desired to mount objects at different locations relative to the types of working machinery. The mounting method in accordance with the present disclosure would create a mounting assembly that allows the operator to position objects at desired locations once the rail is installed. The mounting method of the present disclosure would allow objects to be mounted and some of the metal shavings or debris created during the mounting process would be contained.

Although the embodiment is shown and described as being utilized with an extruded aluminum conveyor frame, other materials could be utilized for the frame while operating within the scope of the present disclosure.

We claim:

1. A conveyor frame assembly, comprising:
   a pair of spaced side rails each extending from a first end to a second end and having an outer surface;
   an alignment notch formed in the outer surface of at least one of the spaced side rails, the alignment notch being recessed from the outer surface of the side rail;
   a completely enclosed receiving and containment cavity extending from an inner surface of the side rail including the alignment notch, the receiving and containment cavity having a constant height receiving portion aligned with the alignment notch formed in the outer surface of the side rail, wherein the receiving and containment cavity is defined by an upper wall and a lower wall; and
   a mounting bracket and a fastener, wherein the fastener includes a shaft portion having external threads that engage both of the upper and lower walls that form the constant height receiving portion of the containment cavity to securely hold the fastener within the containment cavity to secure the mounting bracket to one of the side rails.

2. The conveyor frame assembly of claim 1 wherein the thickness of a wall that forms the side rail is reduced at the alignment notch.

3. The conveyor frame assembly of claim 2 wherein the outer surface of the wall that forms the side rail is generally planar and the alignment notch is recessed from the generally planar outer surface.

4. The conveyor frame assembly of claim 1 wherein each of the pair of spaced side rails includes an alignment notch and a receiving and containment cavity.

5. The conveyor frame assembly of claim 1 wherein the receiving and containment cavity extends along the entire length of each of the side rails, wherein the receiving and containment cavity receives and contains material from the side rail when a hole is formed in the side rail in a position indicated by the alignment notch.

6. The conveyor frame assembly of claim 1 wherein the fastener is a self-drilling fastener having a bite portion that removes the material from the side rail at the alignment notch during attachment of the mounting bracket to the side rail.

7. A method of attaching an object to a side rail of a conveyor frame assembly, the method comprising the steps of:
   forming an enclosed containment cavity extending from an inner surface of the side rail, wherein the containment cavity includes a constant height receiving portion defined by an upper wall and a lower wall;
   forming an alignment notch in a generally planar outer surface of the side rail, wherein the alignment notch is aligned with the constant height receiving portion of the containment cavity;
   positioning an object at a desired location along the length of the side rail;
   positioning a self-drilling fastener having a shaft portion including a series of external threads within the alignment notch; and
   rotating the self-drilling fastener such that the external threads on the shaft portion engage the upper and lower walls of the constant height receiving portion of the containment cavity to hold the fastener in the containment cavity attaching the object to the side rail with the connector that extends through the side rail at the alignment notch and is received within the constant height receiving portion of the containment cavity.

8. The method of claim 7 wherein the connector is a self-drilling fastener having a bite portion, the attachment step comprising:

positioning the bite portion within the alignment notch; and rotating the self-drilling fastener such that the bite portion removes material from the sidewall at the alignment notch to create an opening in the sidewall.

9. The method of claim 8 wherein removed material is received within the containment cavity.

10. The method of claim 7 wherein the attachment step comprises:

forming an attachment hole in the sidewall by removing material from the sidewall within the alignment notch;

positioning the fastener within the alignment hole; and rotating the fastener such that the external threads on the shaft portion engage the upper and lower walls of the constant height receiving portion of the containment cavity to hold the fastener in the containment cavity.

11. The method of claim 10 wherein removed material is received and retained within the containment cavity.

12. The method of claim 7 wherein the object is an attachment bracket.

13. The method of claim 7 wherein the outer surface of the sidewall is generally planar and the alignment notch is recessed from the outer surface.

* * * * *